United States Patent
Anderson et al.

(10) Patent No.: US 10,040,345 B2
(45) Date of Patent: Aug. 7, 2018

(54) SPARE TIRE FUEL TANK

(71) Applicants: Kenneth S. Anderson, Rexburg, ID (US); Klint S. Anderson, Rexburg, ID (US)

(72) Inventors: Kenneth S. Anderson, Rexburg, ID (US); Klint S. Anderson, Rexburg, ID (US)

(*) Notice: Subject to any disclaimer, the term of this patent is extended or adjusted under 35 U.S.C. 154(b) by 0 days.

(21) Appl. No.: 15/438,456

(22) Filed: Feb. 21, 2017

(65) Prior Publication Data

US 2017/0158051 A1    Jun. 8, 2017

Related U.S. Application Data

(62) Division of application No. 14/055,740, filed on Oct. 16, 2013, now abandoned.

(51) Int. Cl.
*B60K 15/07* (2006.01)
*B60K 15/073* (2006.01)
(Continued)

(52) U.S. Cl.
CPC ........ *B60K 15/07* (2013.01); *B60K 15/03177* (2013.01); *B60K 15/063* (2013.01);
(Continued)

(58) Field of Classification Search
CPC .............. B60K 15/07; B60K 15/03177; B60K 15/063; B60K 15/073; B60K 2015/0634; B60K 2015/0344; B62D 43/10
(Continued)

(56) References Cited

U.S. PATENT DOCUMENTS

| 2,660,348 A | 11/1953 | Muller |
| 3,158,193 A | 11/1964 | Anderson |

(Continued)

FOREIGN PATENT DOCUMENTS

| AU | 646627 | 11/1953 |
| EP | 01830570.6 | 12/2003 |
| GB | 2095808 | 10/1982 |

OTHER PUBLICATIONS

Anderson et al., Spare Tire Fuel Tank, U.S. Appl. No. 14/055,740, filed Oct. 16, 2013, Office Action dated Feb. 18, 2016.

(Continued)

*Primary Examiner* — Anne Marie M Boehler
(74) *Attorney, Agent, or Firm* — Schmeiser, Olsen & Watts LLP

(57) ABSTRACT

A non-metallic transfer fuel tank, configured for placement in a spare tire location on a vehicle, includes a rigid non-metallic tank body with a plurality of cutouts formed in the tank body. A fill neck is coupled to the tank body along with a fuel line connector which connects the tank to the vehicle's existing fuel system. A mounting neck formed in the tank body contains a mounting rod. The mounting rod is coupled to a base plate which is below the tank body. The mounting rod is also coupled to a mounting plate which is located above the tank body. The mounting plate is further configured to couple in a winch location in the spare tire location on the vehicle using the same mounting method as was used to mount the spare tire winch.

18 Claims, 19 Drawing Sheets

(51) Int. Cl.
  *B62D 43/10* (2006.01)
  *B60K 15/03* (2006.01)
  *B60K 15/063* (2006.01)

(52) U.S. Cl.
  CPC ............ *B60K 15/073* (2013.01); *B62D 43/10* (2013.01); *B60K 2015/0344* (2013.01); *B60K 2015/0634* (2013.01)

(58) Field of Classification Search
  USPC .................................. 280/830, 834; 220/562
  See application file for complete search history.

(56) References Cited

U.S. PATENT DOCUMENTS

| | | | |
|---|---|---|---|
| 3,330,439 A | 7/1967 | Moorman | |
| 3,893,678 A | 7/1975 | Engdahl | |
| 3,916,938 A | 11/1975 | Hack | |
| 4,015,761 A | 4/1977 | Kokko | |
| 4,111,344 A | 9/1978 | MacDonald | |
| 4,188,969 A | 2/1980 | Lotton et al. | |
| 4,371,181 A | 2/1983 | Monigold | |
| 4,598,848 A | 7/1986 | Clark | |
| 4,602,599 A | 7/1986 | Glagola | |
| 4,930,811 A * | 6/1990 | Tsukada ........... | B60K 15/03177 180/69.4 |
| 5,002,325 A * | 3/1991 | Fought ................ | B60K 15/063 280/830 |
| 5,080,269 A | 1/1992 | Larsson | |
| 5,417,239 A | 5/1995 | Ford | |
| 5,447,110 A | 9/1995 | Brown | |
| 5,669,534 A | 9/1997 | Edgerley | |
| 5,671,000 A | 9/1997 | Hirabayashi | |
| 5,681,358 A | 10/1997 | Spencer | |
| 5,823,408 A | 10/1998 | Kim | |
| 5,853,433 A | 12/1998 | Spencer | |
| 5,941,432 A | 8/1999 | Spencer et al. | |
| 6,003,985 A | 12/1999 | Bekki | |
| 6,026,999 A * | 2/2000 | Wakefield ............... | B60R 11/06 220/4.22 |
| 6,029,876 A | 2/2000 | Spencer et al. | |
| 6,076,858 A | 6/2000 | Funabashi | |
| 6,082,803 A | 7/2000 | Klueger | |
| 6,276,889 B1 | 8/2001 | Dortch | |
| 6,318,581 B1 * | 11/2001 | Garton ................... | B65D 90/24 220/4.12 |
| 6,508,265 B1 | 1/2003 | Bertouille et al. | |
| 6,712,234 B2 | 3/2004 | Boecker | |
| 6,715,626 B2 | 4/2004 | Balzer | |
| 7,093,856 B2 * | 8/2006 | Spenceley ............. | B60P 3/2205 280/838 |
| 7,178,669 B2 | 2/2007 | Atkinson | |
| 7,331,611 B2 * | 2/2008 | Kusu ..................... | B60K 13/04 180/309 |
| 7,857,351 B2 | 12/2010 | Edwards | |
| 8,347,926 B2 | 1/2013 | Voss, III | |
| 8,690,033 B2 * | 4/2014 | Harriton ................ | B62D 43/02 224/319 |
| 2004/0011786 A1 | 1/2004 | Wade | |
| 2004/0129708 A1 | 7/2004 | Borchert | |
| 2012/0043320 A1 | 2/2012 | Beem | |
| 2013/0038287 A1 | 2/2013 | Hara et al. | |

OTHER PUBLICATIONS

Anderson et al., Spare Tire Fuel Tank, U.S. Appl. No. 14/055,740, filed Oct. 16, 2013, Final Office Action dated Nov. 21, 2016.
Anderson et al., Spare Tire Fuel Tank, Australian Patent Application No. 2014250612, filed Oct. 14, 2014, Office Action dated Nov. 13, 2015.

* cited by examiner

SPARE TIRE FUEL TANK

CROSS REFERENCE TO RELATED APPLICATIONS

This application is a divisional of U.S. Patent Application by Kenneth S. Anderson and Klint S. Anderson entitled "SPARE TIRE FUEL TANK", Ser. No. 14/055,740, filed Oct. 16, 2013, now abandoned, all the disclosures of which are all hereby incorporated herein entirely by reference.

BACKGROUND OF THE INVENTION

1. Technical Field

This invention relates to a non-metallic fuel tank which fits in the location normally used for storing the spare tire and which increases the fuel capacity of a vehicle.

2. Background Art

All vehicles have a limited capacity fuel tank. For basic everyday driving, the limited capacity of the fuel tank is not normally an issue. There are many situations, however, where the limited capacity of a vehicle's fuel tank may become an issue. For example, larger vehicles such as pickup trucks burn a lot more fuel than a small vehicle commuting to and from an office. These vehicles may also travel in areas where there are no fuel stations. This makes additional fuel capacity a necessity in many situations.

In order to increase the fuel capacity of a vehicle, people have designed transfer fuel tanks. These transfer fuel tanks have been around for decades.

Transfer fuel tanks are secondary fuel tanks that may be placed in other locations of the vehicle. For example, a secondary fuel tank could be placed in the bed of a truck. As the fuel level drops in the original fuel tank, the transfer fuel tank is accessed by the vehicle automatically or by a switch.

Many transfer fuel tanks fit into the bed of a vehicle such as a pickup truck. These tanks, however, take a lot of room in the bed of the pickup and therefore, leave very little room for hauling large objects which is the reason that many people own pickup trucks. Therefore, a transfer fuel tank that fits where the spare tire is normally located on a vehicle is very desirable.

Also, owners of pickup trucks often put aftermarket wheels and tires on their trucks. These aftermarket wheels and tires are not the same size as the standard wheels and tires on the pickup truck and therefore the standard spare cannot be used on the pickup truck. The larger spare which would be required to fit the aftermarket wheels is often too large to fit into the location normally used for storing the spare tire and therefore the space used for holding the spare tire is unused. Therefore, the space normally used for the spare tire is ideal for storing a transfer tank on these pickup trucks.

A few fuel tanks have been disclosed which would fit in the spare tire location. For example, Beem, U.S. Publication No. 2012/0043320, (hereinafter referred to as the "Beem tank") discloses a deformable fuel tank that fits in place of the spare tire. The tank in the Beem application contains a pump and pumps the fuel into the fuel system of the vehicle. The tank deforms in order to allow the tank to collapse in on itself as fuel is pumped from the tank. This deformability, however, reduces the life of the tank and makes it prone to leaking. Also, unlike, the spare tire location on a vehicle such as a car, the spare tire location on trucks is not carpeted and often has protrusions extending into the spare tire location which could tear or puncture the Beem tank.

Engdahl, U.S. Pat. No. 3,893,678, (hereinafter referred to as the "Engdahl tank") discloses a metal fuel tank that replaces the spare tire. It is coupled into place by a long bolt and a wing nut such as is often used to hold spare tires into place. The fuel tank does not contain its own pump, but is instead coupled to a switch and placed in series with the vehicle's main fuel tank. Fuel is pumped from the spare tire tank directly into the vehicle's fuel system.

The Engdahl tank, however, is formed in the shape and size of a spare tire and fits into the spare tire location exactly wasting a lot of space around the edges of the spare tire location which could be used to store additional fuel.

The Engdahl tank is also made from metal. Metal tanks have many problems including their weight and corrodibility.

Accordingly, what is needed is a durable non-metallic spare tire fuel tank that is lightweight and corrosion resistant and which maximizes the available room for fuel storage.

DISCLOSURE OF THE INVENTION

The spare tire fuel tank, as disclosed hereafter in this application, is corrosion resistant, lightweight and maximizes the amount of fuel that can be stored in the spare tire location on a vehicle. In particular embodiments, a fuel tank, configured for placement in a spare tire location on a vehicle, includes a rigid non-metallic tank body with a plurality of cutouts formed in the tank body. A filler neck is in fluid communication with the tank body. A fuel line connector is coupled to the tank body, wherein the fuel line connector is also fluidly coupled to an existing fuel system in the vehicle.

A mounting system for a fuel tank for use in a spare tire location of a vehicle may include a base plate, wherein the base plate includes at least one tank retaining hole. A mounting rod is coupled to the base plate and to a mounting plate. The mounting plate further comprises a winch location coupler system.

An alternate embodiment of a fuel tank, configured for placement in a spare tire location on a vehicle, may include a rigid non-metallic tank body. A plurality of cutouts are formed in the rigid non-metallic tank body. A fill neck is in fluid communication with the rigid non-metallic tank body. A fuel line connector is also in fluid communication with the rigid non-metallic tank body, wherein said fuel line connector is in fluid communication with an existing fuel system of said vehicle. A mounting neck is also coupled to the rigid non-metallic tank body. A mounting rod is placed within the mounting neck. A base plate is coupled to the mounting rod. A mounting plate is also coupled to the mounting rod, wherein the mounting plate is configured to couple to a winch location in the spare tire location on the vehicle.

The foregoing and other features and advantages of the non-metallic spare tire fuel tank will be apparent to those of ordinary skill in the art from the following more particular description of the invention and the accompanying drawings.

BRIEF DESCRIPTION OF THE DRAWINGS

The invention will hereinafter be described in conjunction with the appended drawings where like designations denote like elements, and.

DESCRIPTION OF THE INVENTION

Figure 1:
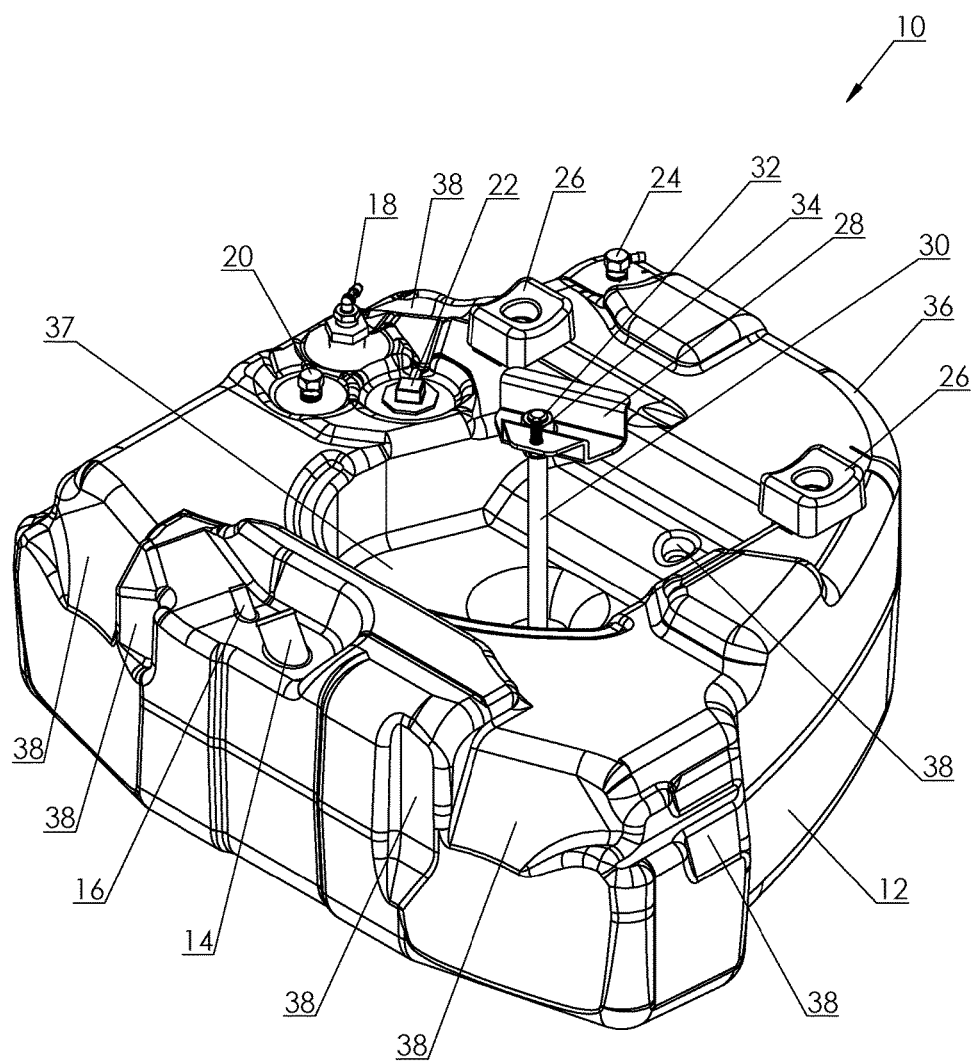
FIG. 1 is an isometric view of a non-metallic spare tire fuel tank.

As discussed above, embodiments of the present invention relate to a non-metallic transfer fuel tank which can be placed in the location normally reserved for the spare tire and which expands the fuel capacity of a vehicle. The spare tire fuel tank specifically disclosed is designed to fit in the spare tire location or spare tire well of many different makes and models of vehicle. The tank is also formed from a material other than metal in order to be light weight and corrosion resistant.

Modern vehicles and particularly pickup trucks have a spare tire well underneath the vehicle. On these vehicles, the spare tire is moved into place by a winch which is coupled to the underside of the vehicle. When the user is replacing the spare tire, the user hooks the spare tire onto the winch and then the user activates or turns the winch in order to move the spare tire into the spare tire location. The winch also secures the spare tire into place.

The spare tire wells on these vehicles are not round and carpeted like the spare tire wells on many cars. Instead, these spare tire wells are larger than the spare tire and are often irregularly shaped due to cross-beams, pipes and the exhaust system of the vehicle.

FIGS. 1-8 and 17-19 illustrate a non-metallic spare tire transfer fuel tank 10 designed to fit into one of the above described spare tire wells. The non-metallic spare tire transfer fuel tank 10 includes a tank body 12. The tank body 12 is formed from any non-metallic material. The tank body 12 is the portion of the fuel tank 10 that contains the fuel. The tank body 12 may be formed from any non-metallic material which does not react with the fuel contained in it. For instance, diesel fuel is less volatile than gasoline and so diesel fuel tanks may be formed from any polymeric, ceramic, composite, nylon or the like. The tank body 12 could also be lined with a material other than the one used to form the tank body 12 itself. The preferred materials for the tank body 12 are those that can be easily formed through processes such as rotational molding or the like. By using rotational molding to form the tank body 12, a seamless tank body 12 may be created which has increased strength. The tank body 12 should also be formed from a rigid or semi-rigid material that resists puncturing and tearing. The tank body 12 may further be exposed to the elements for extended periods of time. Therefore the materials used to form the tank body 12 will need to withstand the elements without degrading. The tank body 12 may further be exposed to objects bouncing up underneath the vehicle or to scraping along the ground when the vehicle goes off road. One material, which has the characteristics desired, is high density cross-linked polyethylene.

High density cross-linked polyethylene can withstand heat and cold. It is also very resistant to chemicals and has high impact strength.

The tank body 12 may be formed in any shape desired. In the embodiments illustrated in the figures, the tank body 12 is formed in a shape which minimizes the amount of excess or wasted space in the spare tire well. This, in turn, maximizes the amount of fuel that can be held in the tank 10. The tank body 12 in the figures is a slightly rounded square or rectangle. This shape best fits the spare tire wells in a variety of makes and models of vehicles, making the tank 10 more universal. Because the spare tire wells in different vehicles are different shapes, having a universal or semi-universal tank body 12 shape means that the same tank body 12 can be used in a variety of vehicles, rather than the manufacturer needing to produce a different tank 10 for each different vehicle.

The tank body 12 also has multiple cutouts 38 formed into its surface. These cutouts 38 are indentations that allow the tank body 12 to fit around different cross-beams and pipes running around the spare tire wells of a variety of vehicles.

Figure 17:
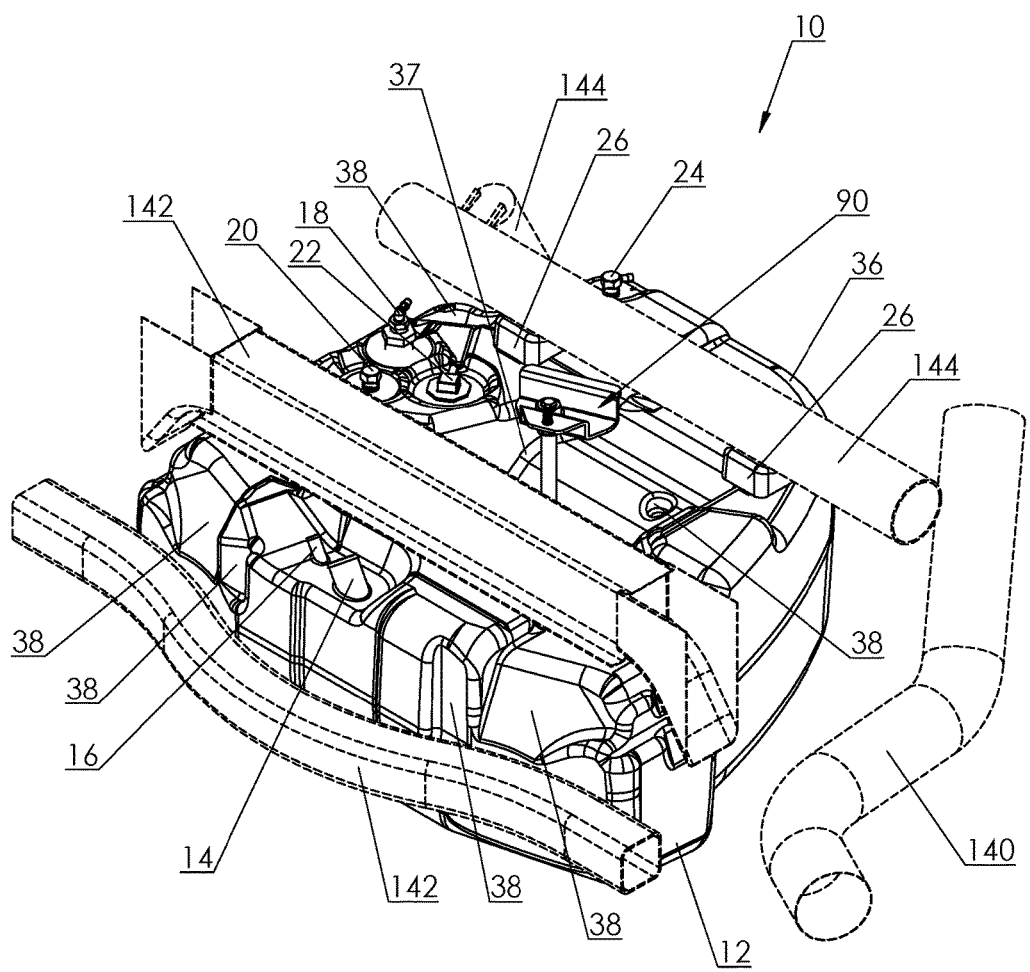
FIG. 17 is an isometric view of a non-metallic spare tire fuel tank surrounded by pipes and cross-members which may be located in the spare tire location of a pickup truck.
Figure 18:
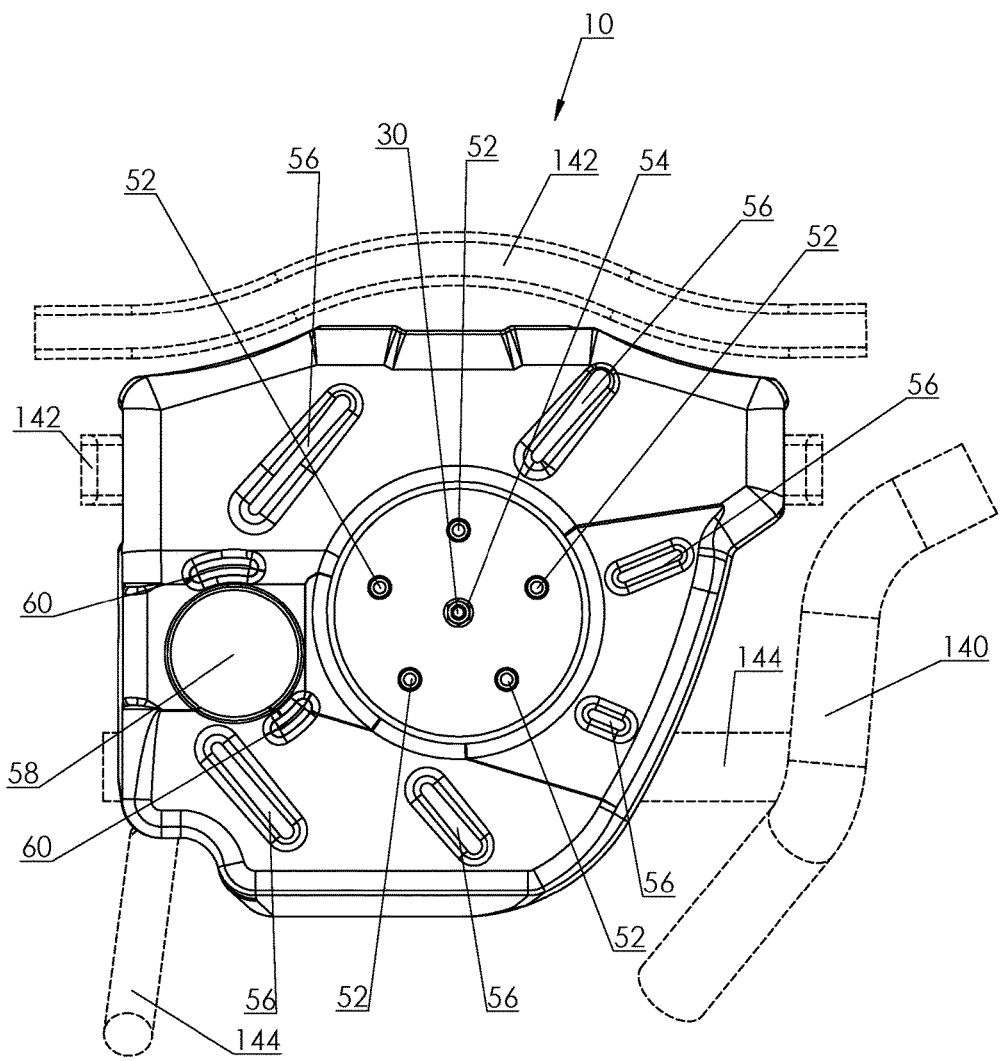
FIG. 18 is a bottom view of a non-metallic spare tire fuel tank surrounded by pipes and cross-members which may be located in the spare tire location of a pickup truck.
Figure 19:
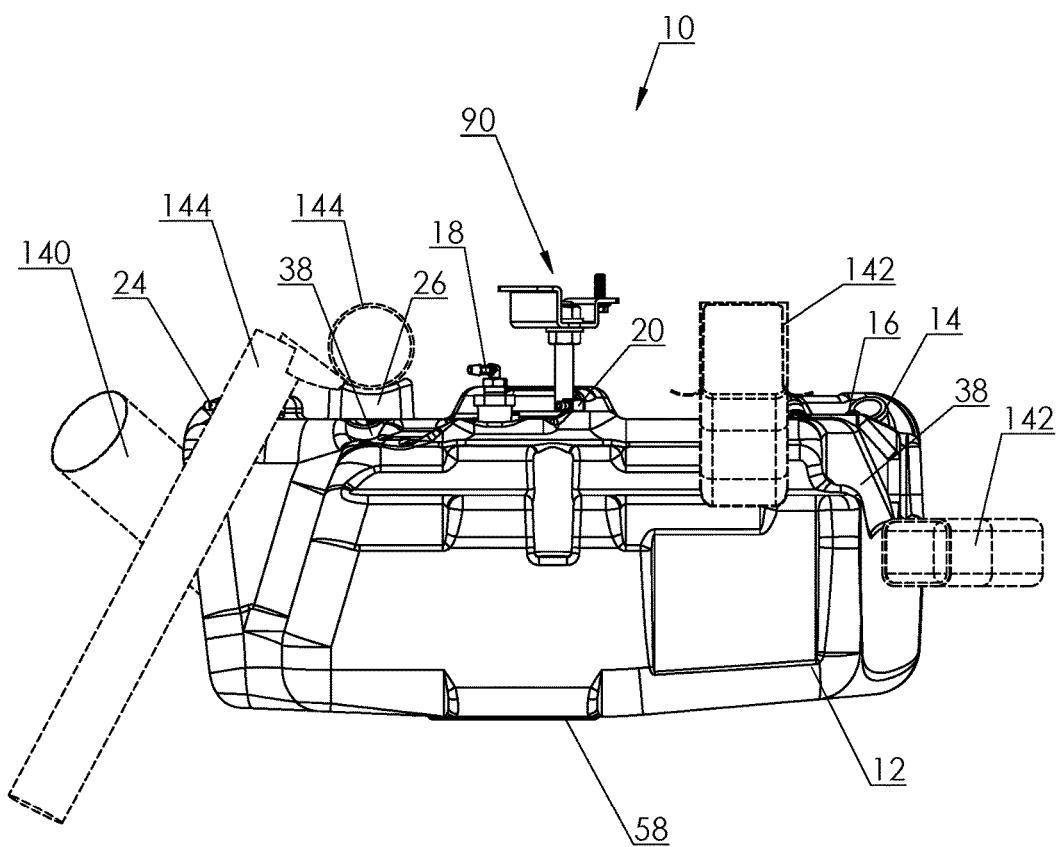
FIG. 19 is a side view of a non-metallic spare tire fuel tank surrounded by pipes and cross-members which may be located in the spare tire location of a pickup truck.

FIGS. 17-19 illustrate a common configuration of cross beams 142, pipes 144 and exhaust pipes 140 which may surround a spare tire well in a vehicle. In these figures, the pipes 144, exhaust pipes 140 and cross-beams 142 are dashed to show that they are not part of the tank 10. Instead the pipes 144, exhaust pipes 140 and cross-beams 142 are already existing in the vehicle and the tank 10 has been designed in order to allow the tank 10 to fit between these pipes 144, exhaust pipes 140 and cross-beams 142 while maximizing the space and volume available for fuel storage.

The configuration of the pipes 144, cross-beams 142 and exhaust pipes 140 of different vehicles will be located differently. Therefore, the tank body 12 has been configured with cutouts 38 in order to accommodate as many different configurations as possible while maximizing fuel storage volumes.

The tank body 12 may be configured to abut many of the cross-beams 142 and pipes 144. The exhaust pipes 140, however, get hot due to the exhaust traveling through them. Therefore the cutouts 36 for the exhaust system need to allow enough clearance between the tank body 12 and the exhaust pipes 140 to prevent the tank body 12 and the fuel contained in the tank body 12 from getting too hot.

Cutouts 38 may be included in the tank body 12 to accommodate protrusions which may extend from the spare tire well as well as accommodating cross-beams 142, pipes 144 and the exhaust system 140.

Cutout 37 is an additional cutout which is formed as an indentation or well in the center top of the tank body 12. Cutout 37 acts as the other cutouts 38 in that it allows clearance for protrusions extending into the vehicle's spare tire well.

Figure 2:
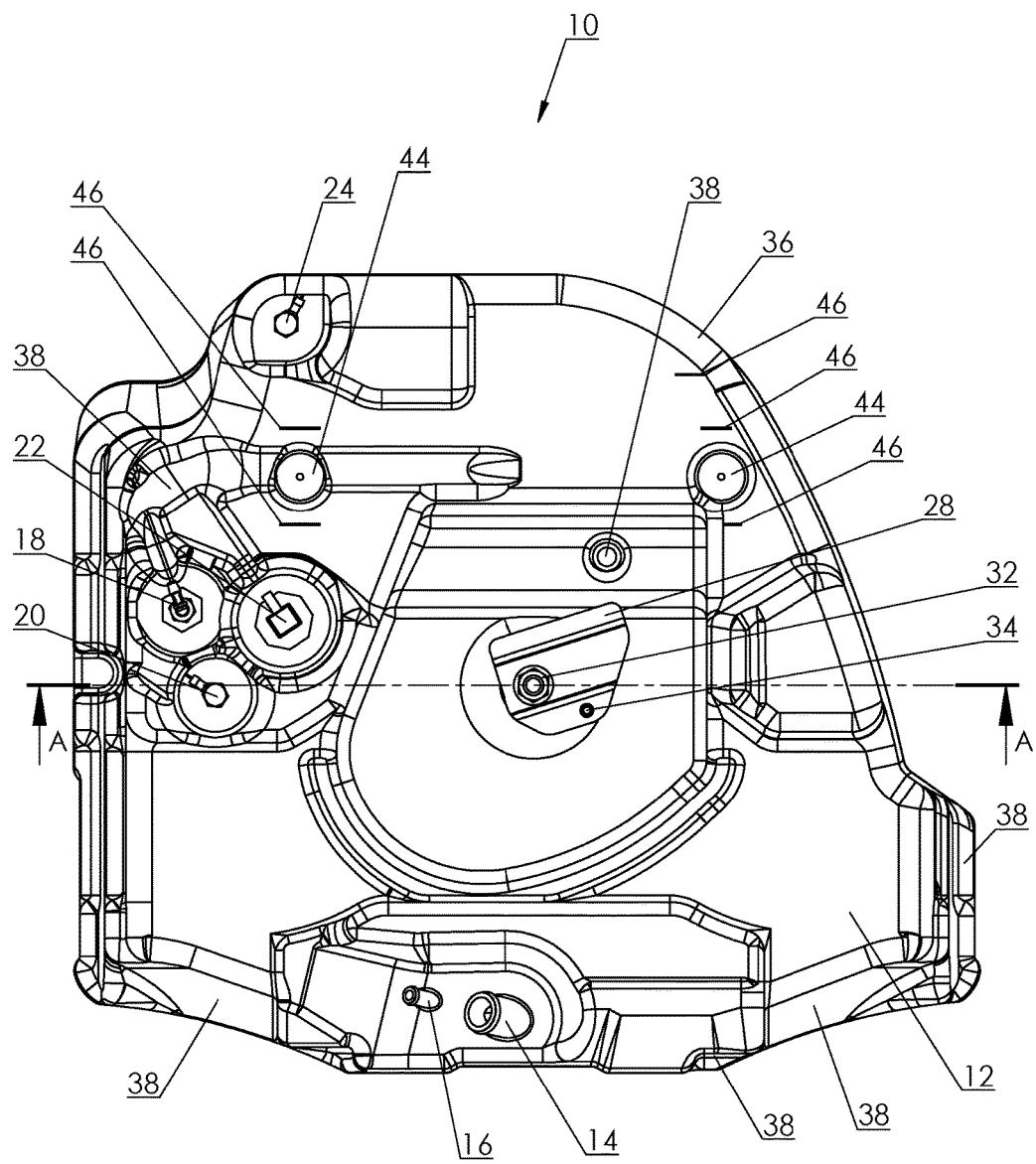
FIG. 2 is a top view of a non-metallic spare tire fuel tank.
Figure 3:
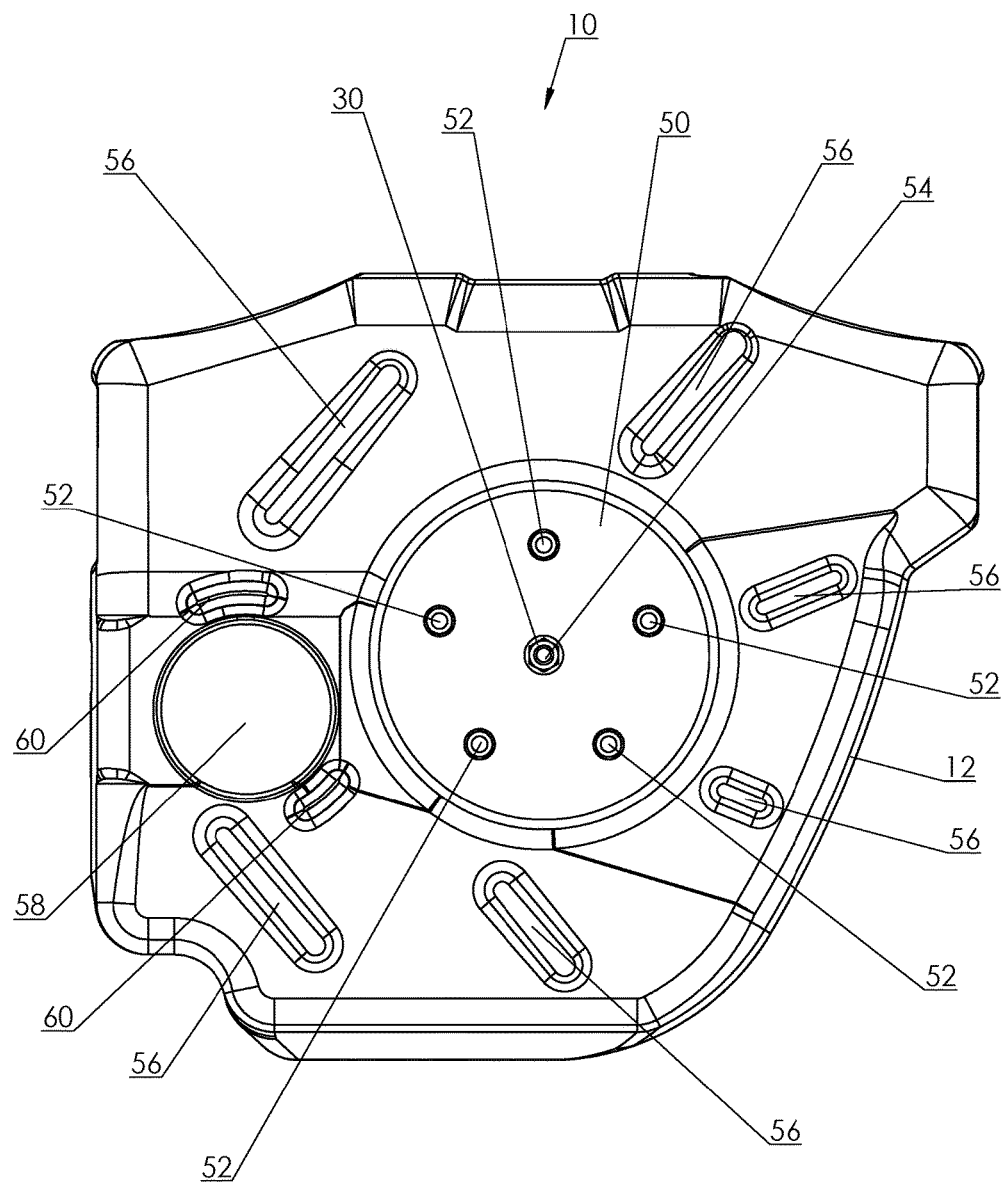
FIG. 3 is a bottom view of a non-metallic spare tire fuel tank.
Figure 4:
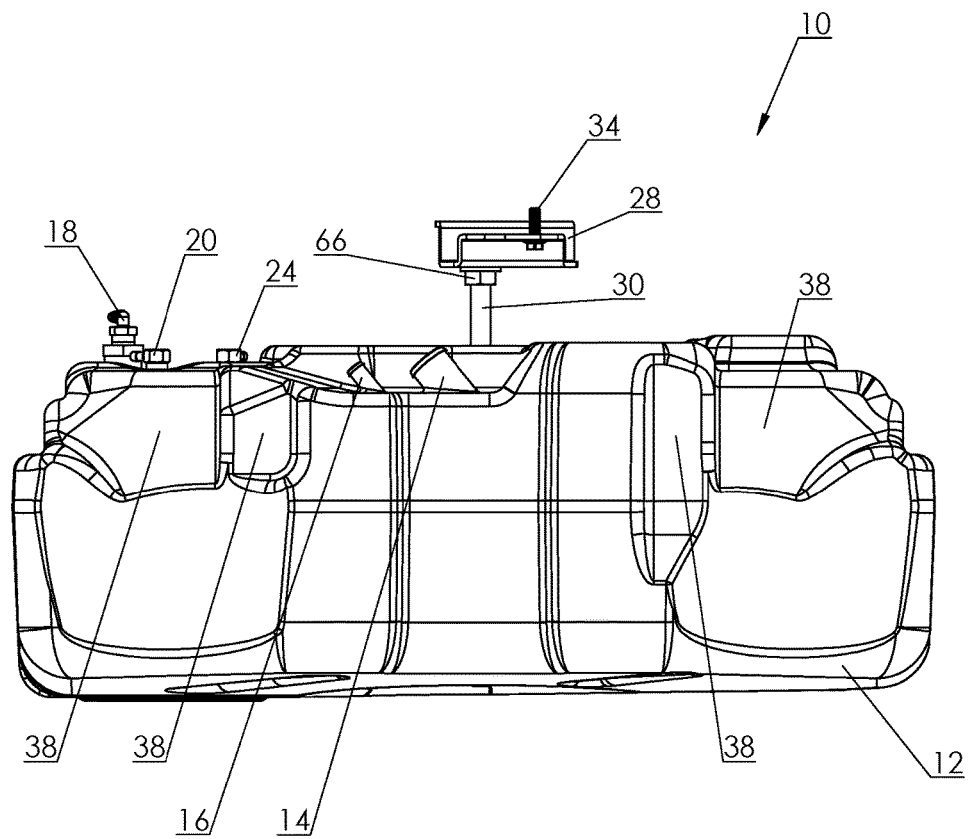
FIG. 4 is a first side view of a non-metallic spare tire fuel tank.
Figure 5:
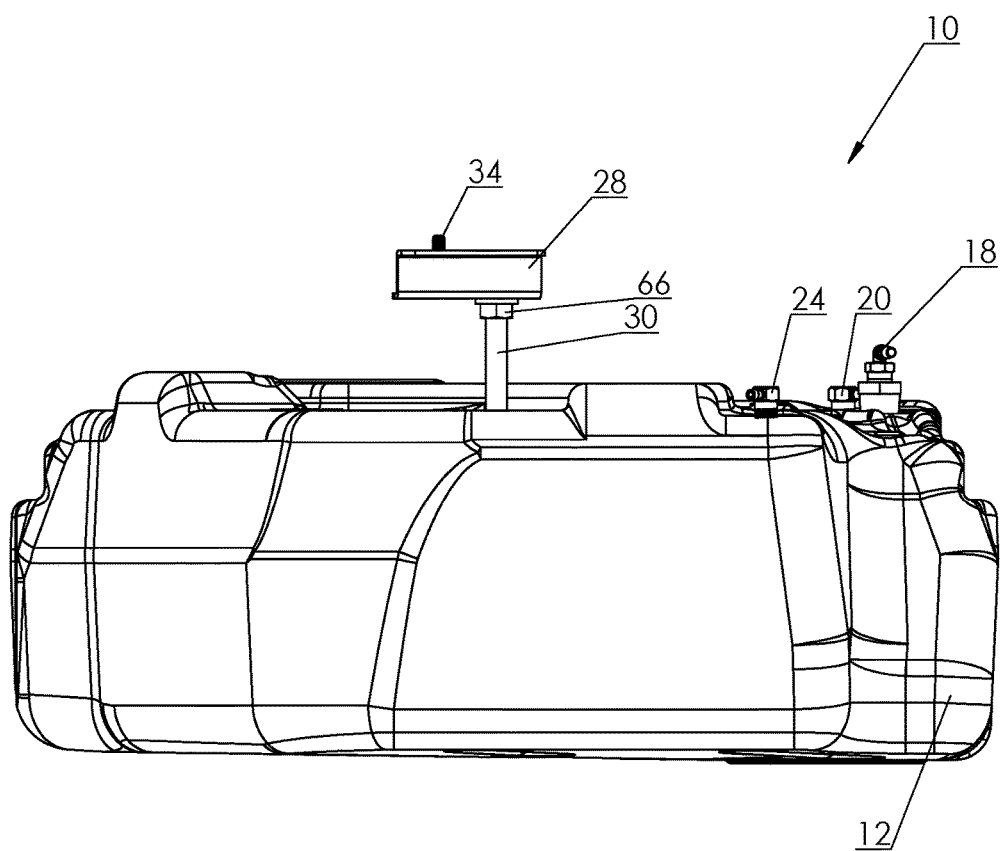
FIG. 5 is a second side view of a non-metallic spare tire fuel tank.
Figure 6:
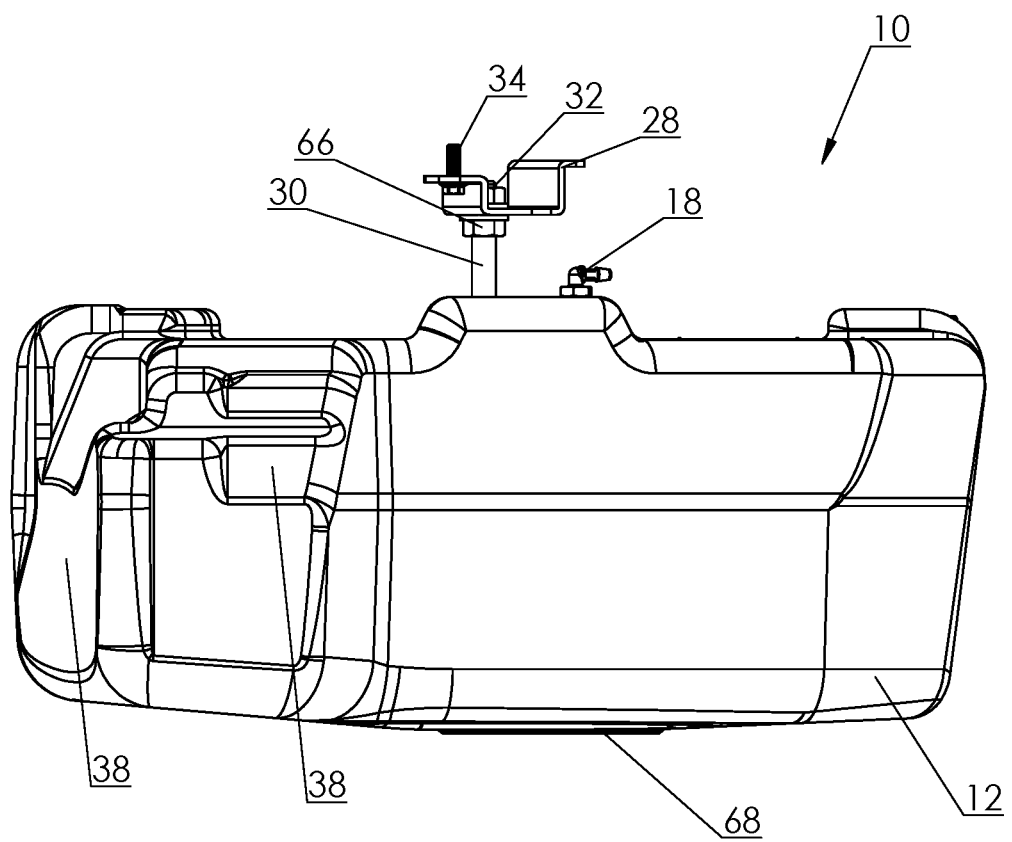
FIG. 6 is a third side view of a non-metallic spare tire fuel tank.
Figure 7:
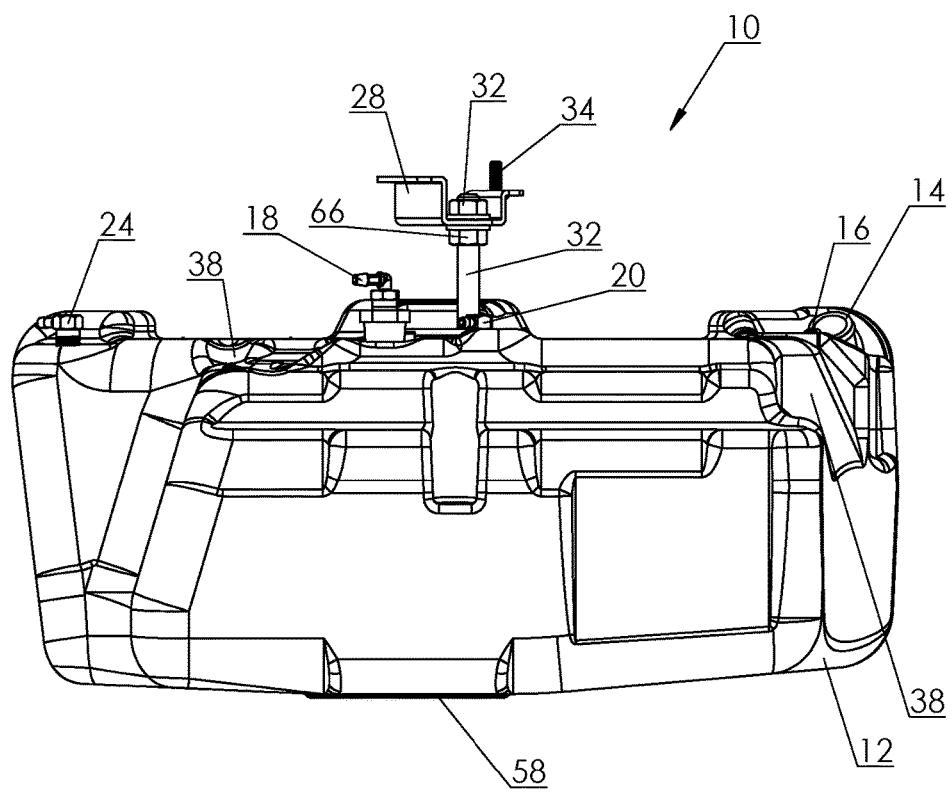
FIG. 7 is a fourth side view of a non-metallic spare tire fuel tank.

The tank body 12 may also have additional indentations as illustrated in FIGS. 1-8. A sink 58 is formed in the tank body 12 as shown in FIG. 3. The sink 58 is a slight extrusion that extends from the bottom of the tank body 12. From the inside of the tank body 12, the sink 58 is a slight depression in the bottom of the tank body 12. The sink 58 acts as the lowest part of the tank body 12. The fuel in the tank 10 flows towards the sink 58.

FIG. 3 also illustrates multiple indentations in the bottom of the tank body 12 referred to as fuel flow protrusions 56. These fuel flow protrusions 56 protrude into the interior of the tank body 12 and help to control the direction that the fuel flows inside the tank body 12. The fuel flow protrusions 56 help to cause the fuel to flow into the sink 58 in the tank 10. Thereby allowing the majority of the fuel in the tank 10 to be pumped out by pumping from the sink 58.

Additional indentations in the outside of the tank body 12 act as baffles 60. The baffles 60 extend as protrusions in the inside of the tank body 12. The baffles 60 abut the edges of the sink 58. The baffles 60 help to minimize fuel sloshing while the vehicle is in motion.

The tank body 12 may also be fluidly connected to a filler neck 14 as illustrated in FIGS. 1-8. The filler neck 14 may be formed directly into the tank body 12 or may be coupled to an opening in the tank body 12. The filler neck 14 couples to a pipe or hose which is attached to a fuel fill opening on either the outside or inside of the vehicle. Typically this fuel fill opening is not going to be the standard fuel fill opening in the truck. The fuel fill opening for the spare tire tank 10 will typically be an additional aftermarket fuel fill opening placed on either the outside of the truck or the inside wall of the truck bed. The aftermarket fuel fill opening will look and function the same or similarly to the factory fuel fill opening which connects to the vehicle's preexisting fuel system.

Fuel is placed in the fuel fill opening. The fuel travels through the pipe coupled to the filler neck 14. The fuel then travels down the filler neck 14 and into the tank body 12.

A vent 16 is also coupled to the tank body 12. The vent 16 may either be formed into the tank body 12 or it may be coupled to an opening in the tank body 12. The vent 16 allows air inside the tank body 12 to be vented to the outside of the vehicle when the tank 10 is being filled. The vent 16 is also coupled to a pipe or a hose as is the filler neck 14. The hose coupled to the vent 16 T's into the pipe or hose coupled to the filler neck 14. This allows air to travel out of the fuel fill opening in the vehicle as fuel is taking the air's place in the tank 10.

A fuel line connector 18 is coupled to the tank body 12. The fuel line connector 18 is coupled to a pipe 76 which extends into the tank body 12 above the sink 58. The pipe 76 also may extend into the sink 58 itself. The fuel line connector 18 is also coupled to a fuel line or hose. The fuel line connected to the fuel line connector 18 connects to a pump which pumps the fuel from the spare tire tank 10 into the existing fuel system of the vehicle.

The pump is controlled by a controller within the vehicle cab which allows the user to pump a set amount of fuel into the vehicle's fuel system. The controller could also be configured to allow the user to turn the pump on and then turn it off again manually if desired.

A return line connector 20 is also coupled to the tank body 12. The return line connector 20 may be inserted in an opening formed in the tank body 12. The return line connector 20 is coupled to a hose or fuel line. The hose connected to the return line connector 20 is also coupled to the existing fuel system of the vehicle. If the user turns the pump on when the vehicle's existing fuel system is close to full, the fuel from the tank 10 will be pumped into the fuel system of the vehicle. When the vehicle's existing fuel system becomes full, the fuel will flow down the hose connected to the return line connector 20, through the return line connector 20 and back into the tank 10. The return line connector 20 prevents the user from damaging the vehicle's existing fuel system by overfilling.

The return line connector 20 may also act as a vent to vent air and fumes from the tank 10.

The return line connector 20 is also a rollover valve. If the vehicle rolls over in an accident. The return line connector 20 prevents the fuel in the tank 10 from flowing out.

A level sensor connector 22 is also coupled to the tank body 12. The level sensor connector 22 may be inserted into an opening formed in the tank body 12. The level sensor connector 22 is coupled to a level sensor 74 which extends into the tank body 12 and measures the level of the fuel in the tank 10. The level sensor 74 may be an electronic level sensor or it may be any type of level sensor that can measure the level of fuel in the tank 10. The level sensor connector 22 is coupled to the controller which also acts as a fuel gage for the user.

An atmospheric vent 24 is also coupled to the tank body 12. The atmospheric vent 24 may be a rollover vent inserted into an opening in the tank body 12. The atmospheric vent 24 allows the fumes and air in the tank 10 to vent to the atmosphere. The atmospheric vent 24 is also a rollover valve, so the vent 24 closes automatically if the vehicle rolls over.

Figure 8:
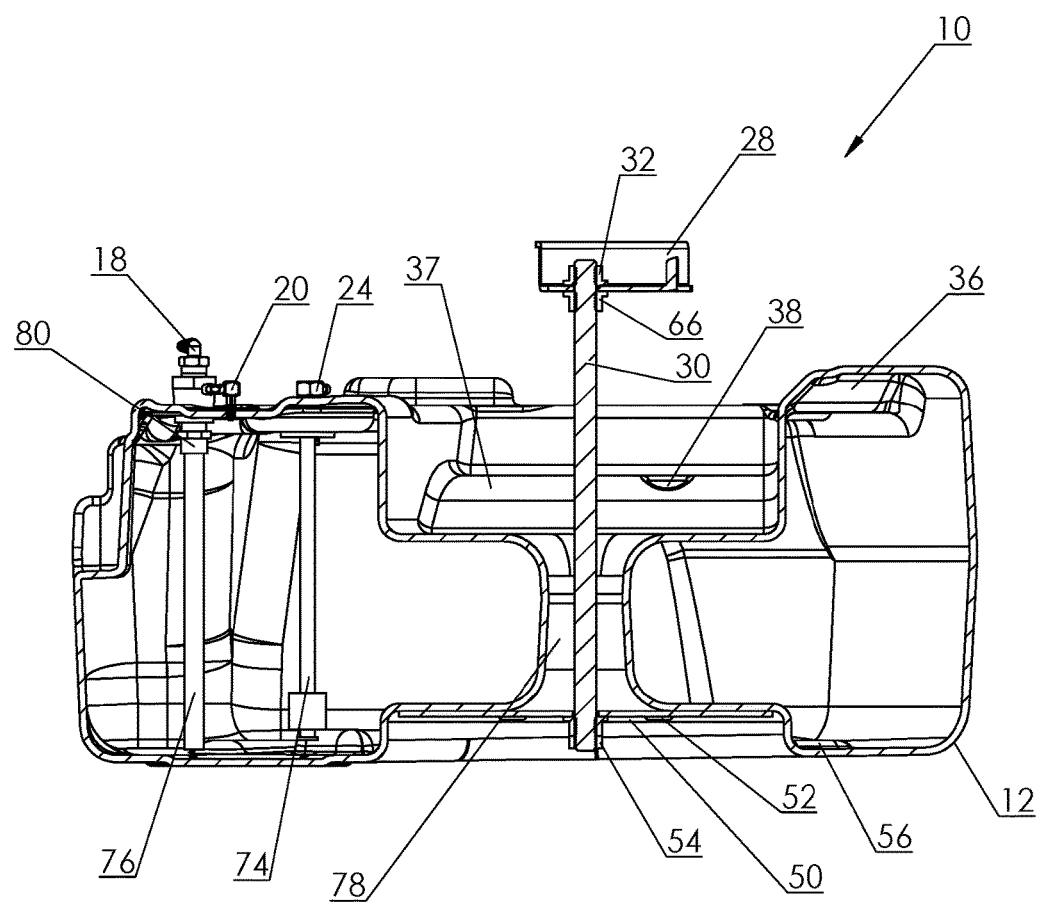
FIG. 8 is a cross-sectional view of a non-metallic spare tire fuel tank taken along line A-A of FIG. 2.

As illustrated in FIG. 8, a mounting neck 78 is also formed in the tank body 12. The mounting neck 78 is a hollow tube that runs from the top to the bottom of the tank body 12. The mounting neck 78 makes the tank body's 12 shape that of a square donut. In the figures, the mounting neck 78 is formed as part of the tank body 12 itself. However, in other embodiments, the mounting neck 78 may be formed separately and inserted into an opening that runs through the top and bottom of the tank body 12.

The mounting neck 78 allows the tank 10 to be mounted into the spare tire well of the vehicle with one of the mounting systems 90 illustrated in FIGS. 9-16.

The mounting neck 78 also acts as a system of baffles and prevents the fuel from sloshing in the tank.

The mounting systems 90 include a base plate 50 which is a flat round piece of material. The base plate 50 fits into an indentation on the underside of the tank body 12. The base plate 50 acts to hold the tank body 12 securely in place when the tank 10 is mounted in the spare tire well. The base plate 50, though, illustrated as a flat round plate may be formed in any shape or configuration desired, such as a flat rectangle, square or the like.

The base plate 50 has multiple tank retaining holes or openings 92 which are configured to receive multiple protrusions 52 (See FIGS. 3 and 8) formed in or coupled to the bottom of the tank body 12. The protrusions 52 when inserted into the tank retaining holes 92 prevent rotation of the tank body 12 when the tank 10 is in use after mounting. The tank retaining holes 92 may be round holes as illustrated or may be square, triangular, rectangular and the like. The protrusions 52 may also be any shape desired so long as the shape of the protrusions 52 may be inserted into the tank retaining holes 92.

In alternate embodiments, indentations may be formed on the bottom of the tank body 12 and the base plate 50 may include multiple protrusions configured to insert into the indentations.

The base plate 50 also has a mounting rod opening 99. Mounting rod opening 99 is an opening in the center of base plate 50 which is large enough to allow a mounting rod 30 to be inserted through it. Mounting rod opening 99 may be formed in any shape desired or at any location on the base plate 50 so long as it serves its purpose.

Mounting rod 30 is illustrated as a cylindrical rod which is inserted through base plate 50 at mounting rod opening 99. Mounting rod 30 also passes through mounting neck 78 in the tank body 12. Mounting rod 30 may be any type of rod, bar, chain, wire, rope, or the like that can be placed through mounting neck 78 and coupled to the mounting base 50.

Mounting rod 30 is coupled in place to base plate 50 with mounting rod couplers 54. Mounting rod couplers 54 may be a nut as illustrated in the figures, or else it may be glue, epoxy, or the like. The mounting rod couplers 54 may also be an expansion of the end of mounting rod 30 which cannot pass through mounting rod opening 99.

The other end of the mounting rod 30 is coupled to a mounting plate 28. Mounting plate 28 is located on the top of the tank 10. When the tank 10 is installed in a vehicle the spare tire winch, which was discussed above, is removed. The mounting systems 90 are designed to couple to the remaining hardware once the winch is removed. Mounting plate 28 is a flat or bent plate that may be square, rectangular, circular or the like. Mounting plate 28 is bent or flat depending on the contours of the surface to which the spare tire winch was mounted. The contours and shape of mounting plate 28 are dictated by the location at which the spare tire winch was mounted.

Mounting plate 28 further comprises a winch location coupling system. The winch location coupling system is an arrangement of bolts and openings which correspond to the openings and hardware remaining after the spare tire winch was removed.

Figure 9:
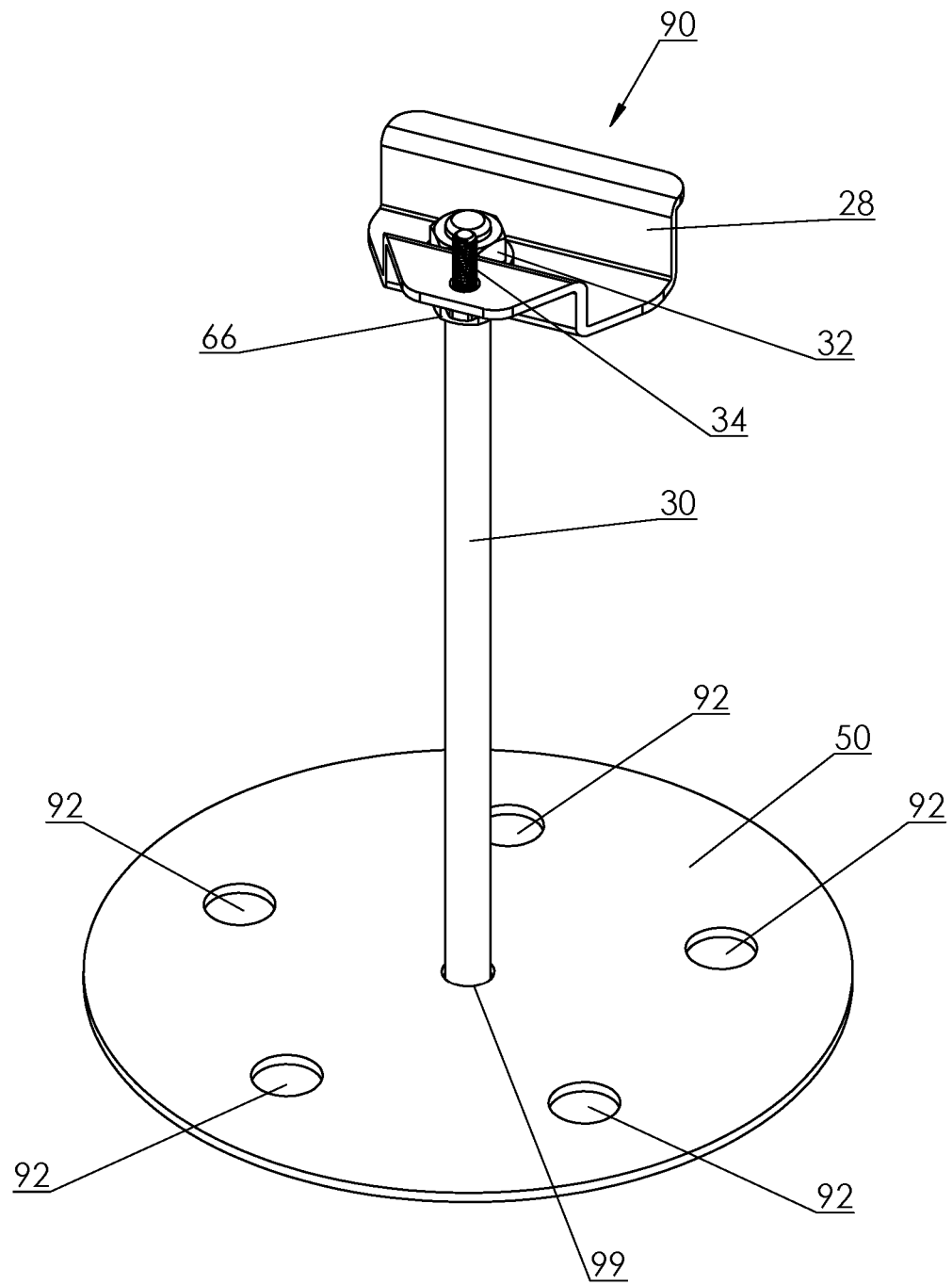
FIG. 9 is an isometric view of a mounting system for a non-metallic spare tire fuel tank.

FIG. 9 illustrates a mounting plate 28 which is bent in order to fit in the spare tire winch location. The mounting plate 28 further includes a winch location coupling system comprising a bolt 34 which extends through the mounting plate 28 and will extend into an opening to which the spare tire winch was bolted.

Figure 10:
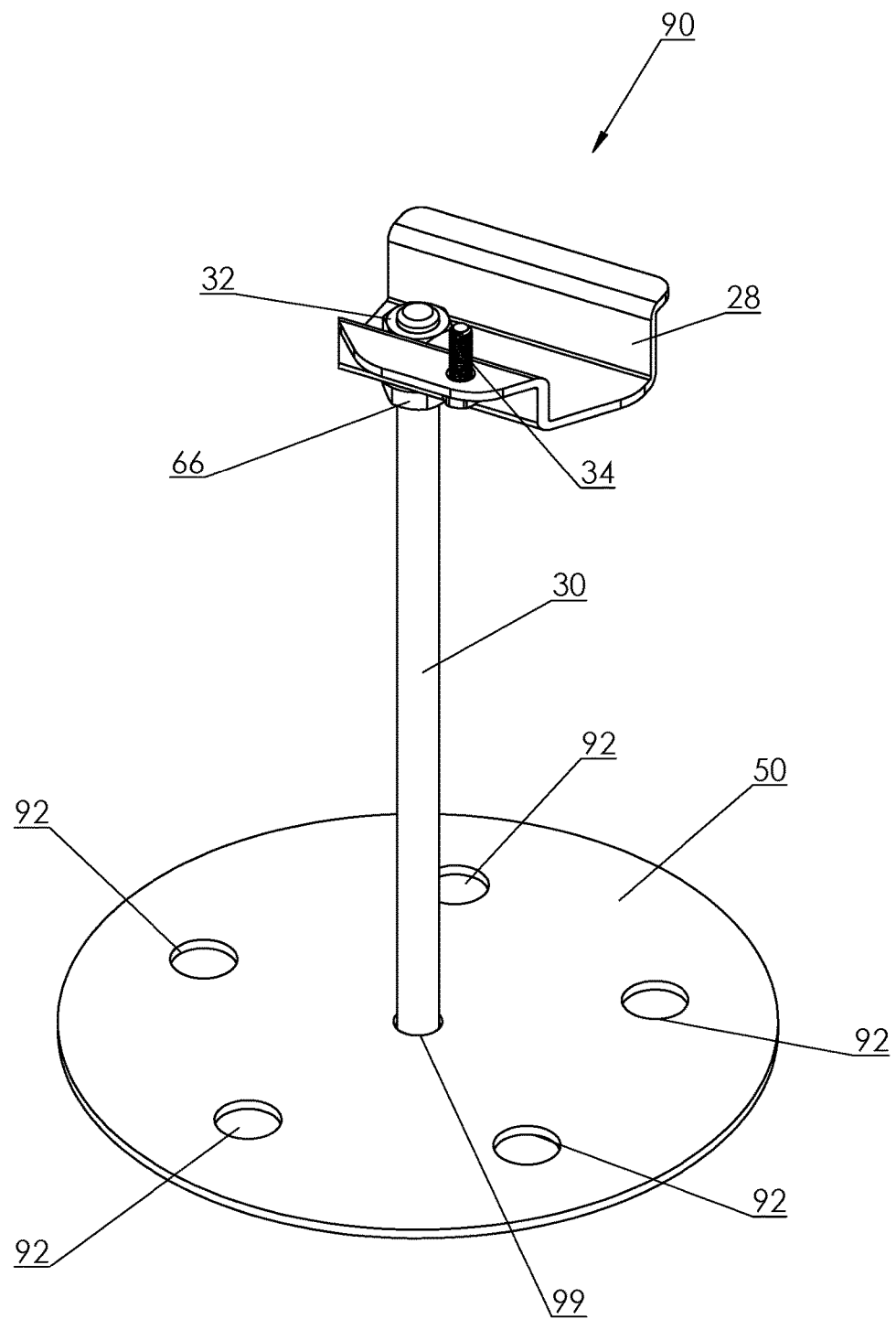
FIG. 10 is an isometric view of a second mounting system for a non-metallic spare tire fuel tank.
Figure 11:
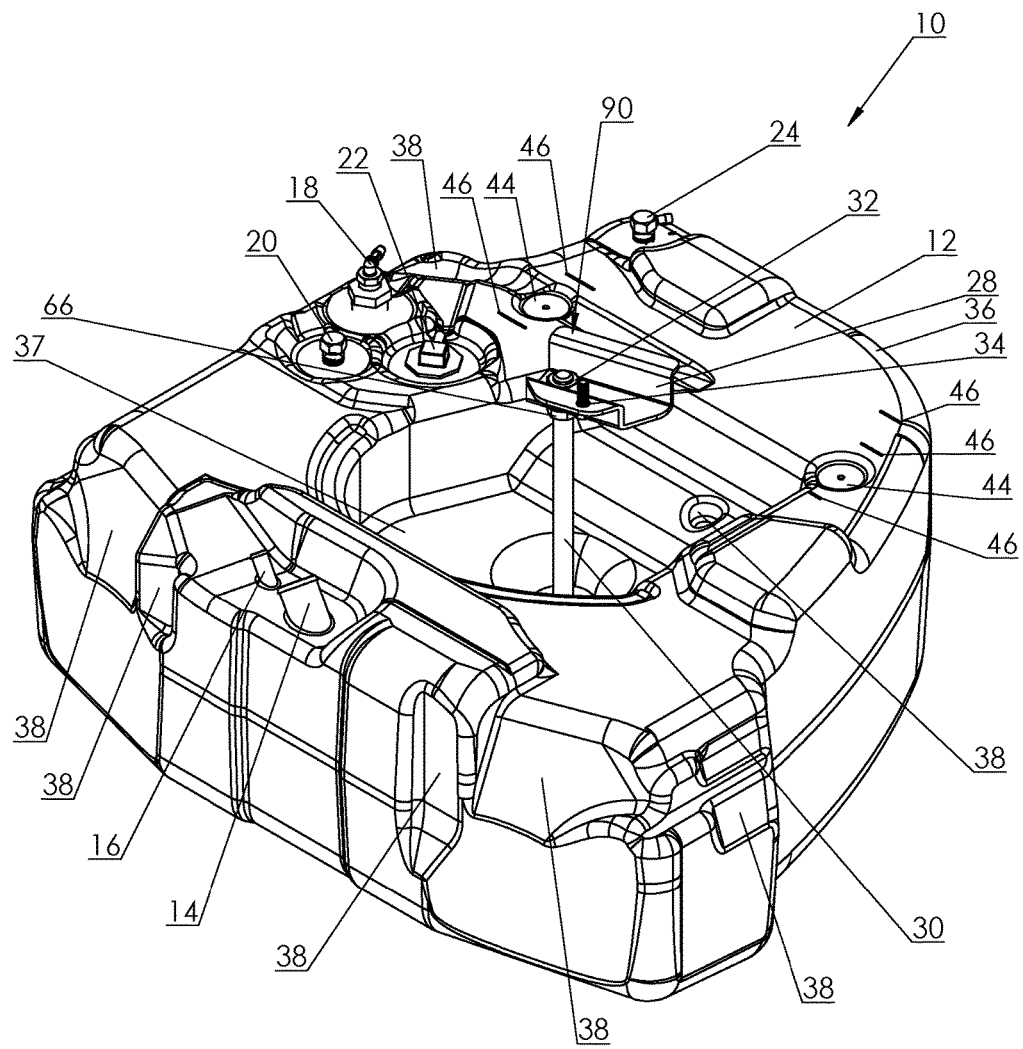
FIG. 11 is an isometric view of a non-metallic spare tire fuel tank with the second mounting system of FIG. 10.

FIGS. 10-11 illustrate a mounting plate 28 which is also bent in order to fit in the spare tire winch location. The mounting plate 28 is also off centered from the rest of the mounting system 90. The mounting plate 28 further comprises a winch location coupling system including a bolt 34 which is placed at a location towards the edge of the mounting plate. The bolt 34 will extend into an opening to which the spare tire winch was bolted.

Figure 12:
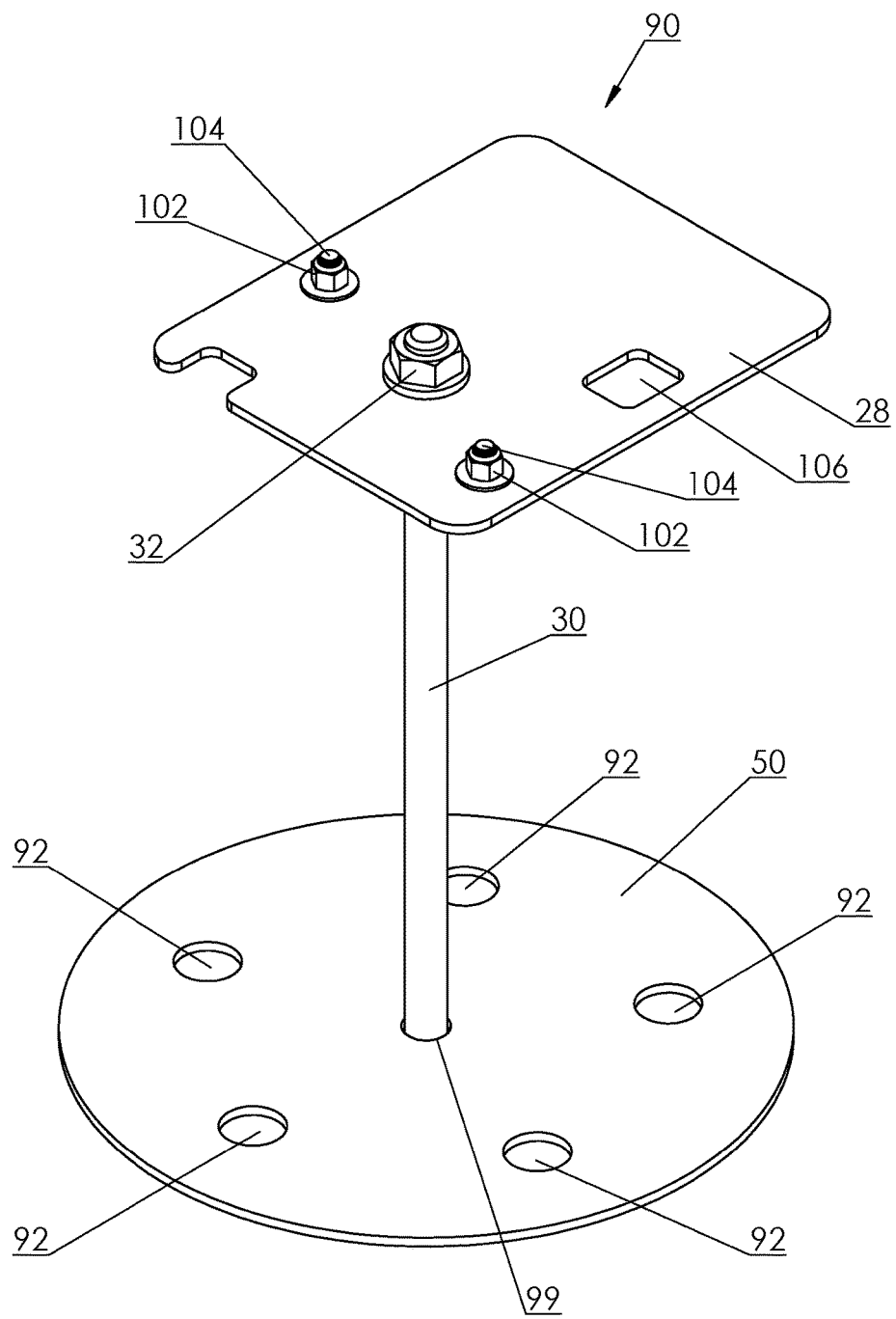
FIG. 12 is an isometric view of a third mounting system for a non-metallic spare tire fuel tank.
Figure 13:
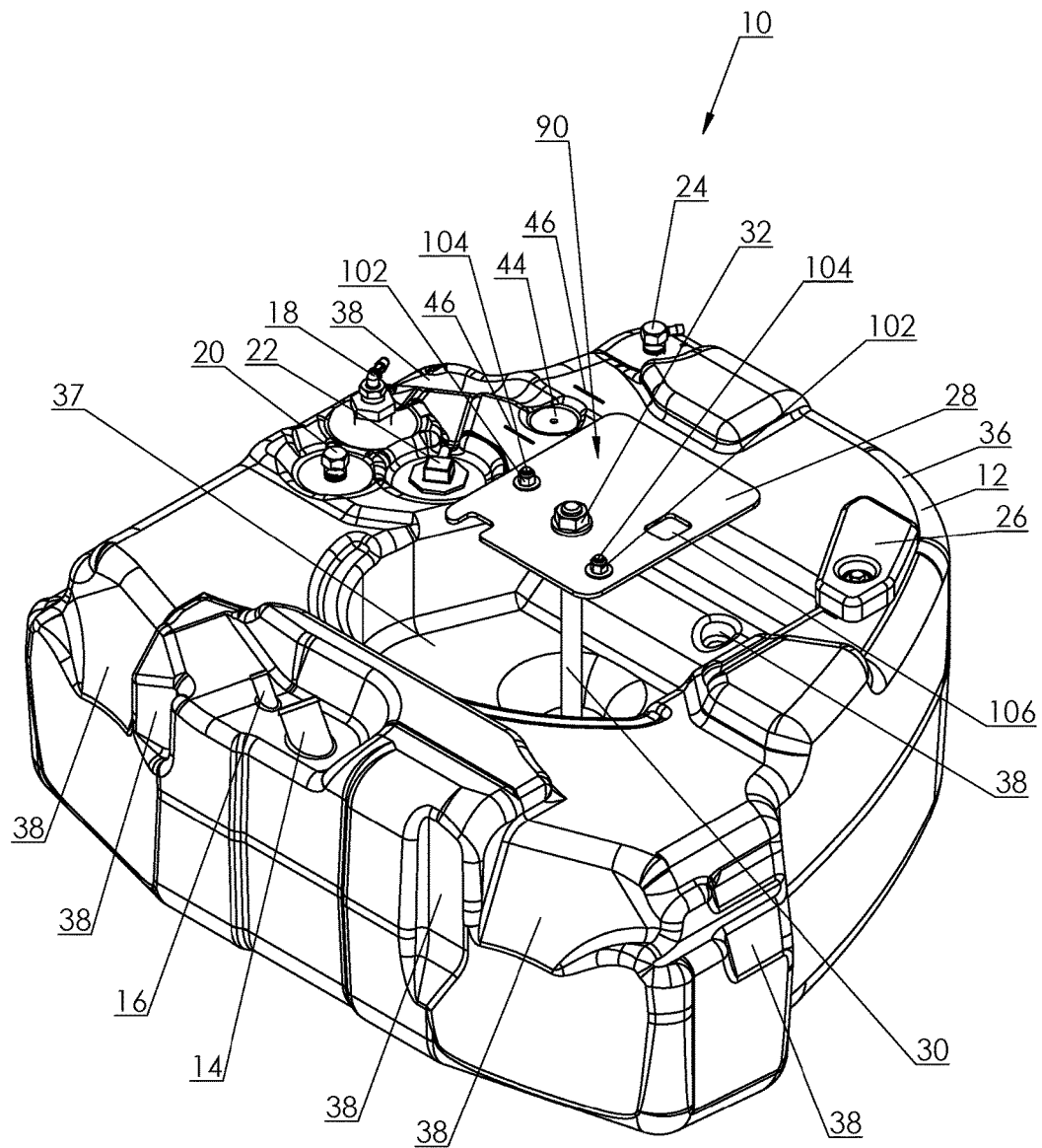
FIG. 13 is an isometric view of a non-metallic spare tire fuel tank with the third mounting system of FIG. 12.

FIGS. 12-13 illustrate a mounting system 90 with a mounting plate 28 which is flat. Mounting plate 28 further has a winch location coupling system which includes an opening 106 cut into mounting plate 28 to allow a protrusion at the spare tire winch mounting location to pass through. The winch location coupling system on this mounting plate 28 also has two bolts 104 which pass through the mounting plate 28 and are secured with nuts 102. When mounted in the spare tire well of a vehicle the bolts 104 will pass through openings in the spare tire winch mounting location and be secured with the nuts 102.

Figure 14:
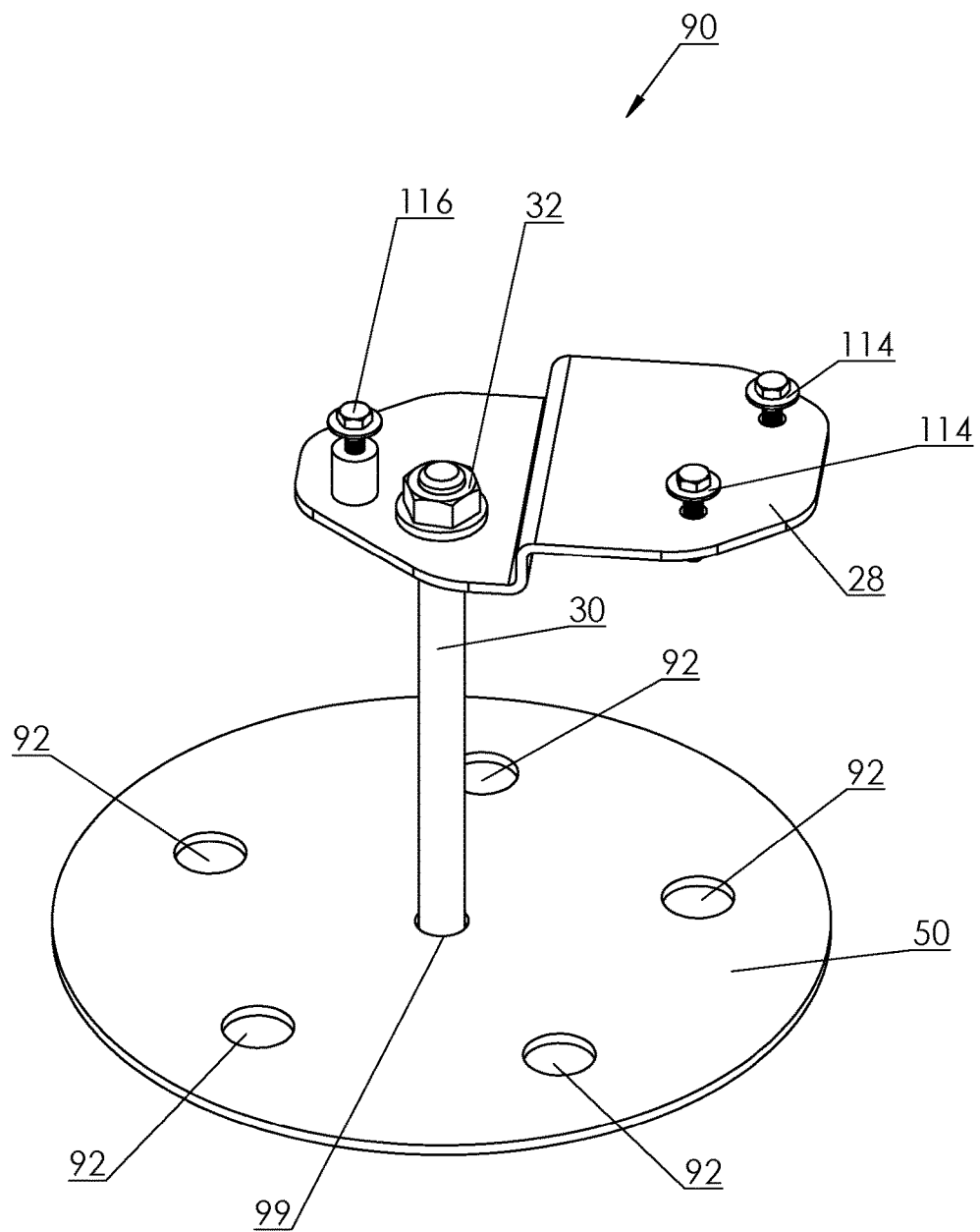
FIG. 14 is an isometric view of a fourth mounting system for a non-metallic spare tire fuel tank.

FIG. 14 illustrates a mounting system 90 with a mounting plate 28 which has only one bend in it to accommodate the spare tire winch mounting location. The mounting plate 28 of this figure also has two bolts 114 located towards one side and an additional bolt 116 located at an opposite side. These bolts, which are part of the winch location coupling system for this mounting plate 28, will be used to mount the mounting plate 28 in the location where the spare tire winch was previously mounted.

Figure 15:
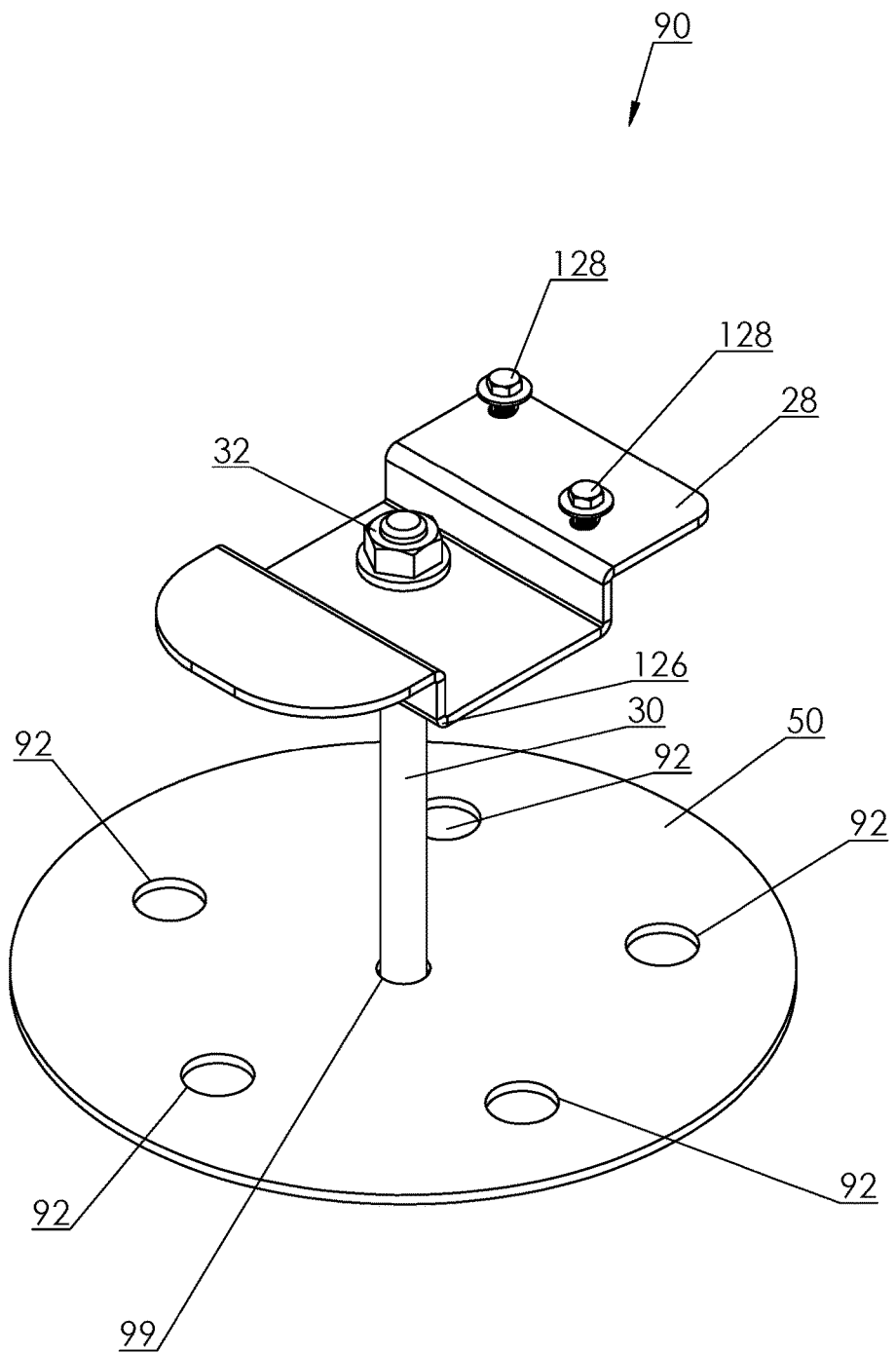
FIG. 15 is an isometric view of a fifth mounting system for a non-metallic spare tire fuel tank.

FIG. 15 illustrates another bent mounting plate 28. This mounting plate has bolts 128 which will be used to mount the mounting plate 28 to the vehicle.

Figure 16:
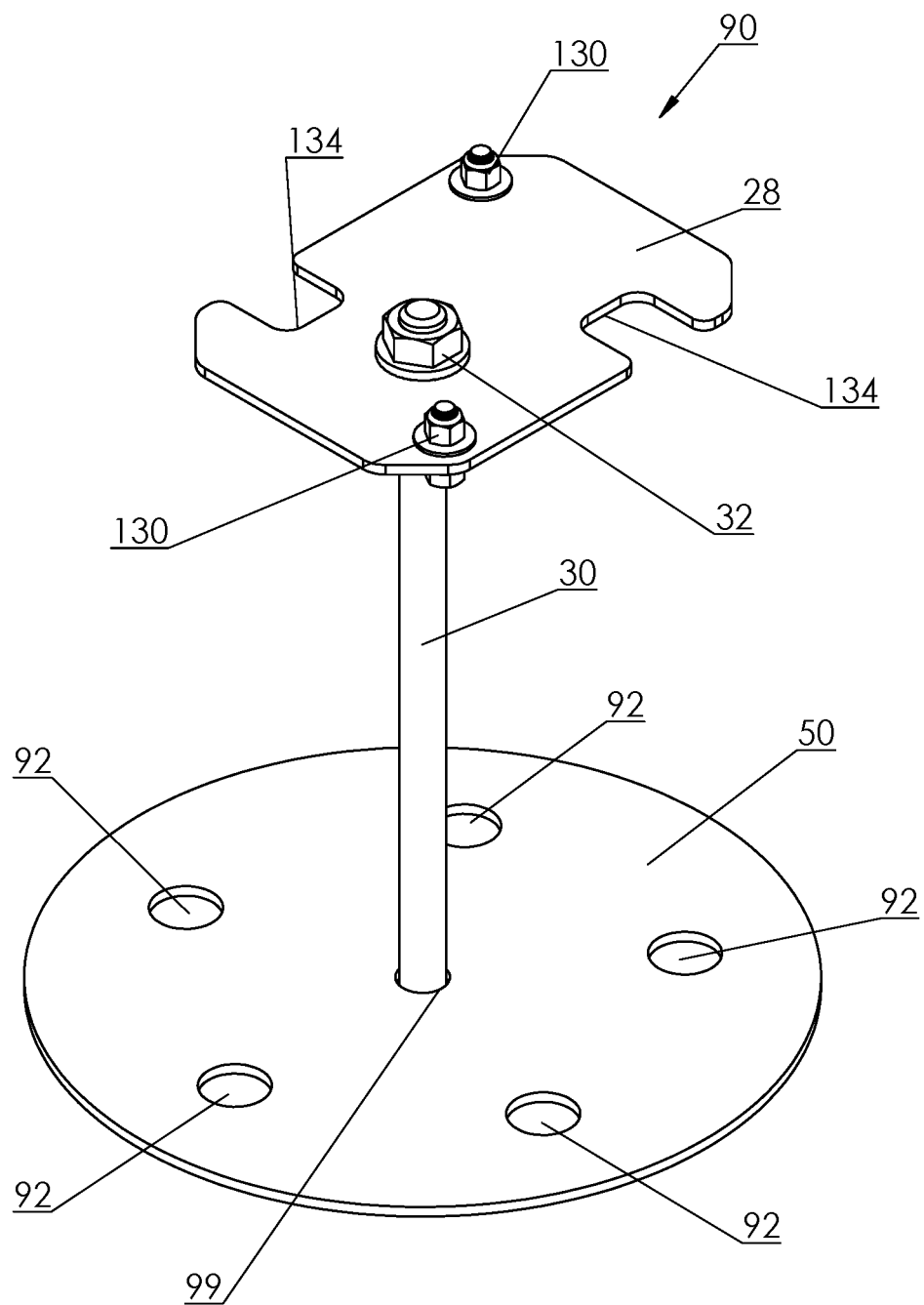
FIG. 16 is an isometric view of a sixth mounting system for a non-metallic spare tire fuel tank.

FIG. 16 illustrates a flat mostly rectangular mounting plate 28. This mounting plate has two cutouts 134 which allow the mounting plate 28 to be secured between two protrusions which extend from the spare tire well. The mounting plate 28 will be secured to the vehicle with bolts 130.

FIGS. 9-16 also illustrate how the mounting plate 28 is coupled to the rest of the mounting system 90. Mounting plate 28 further comprises an opening through which mounting rod 30 is placed. Mounting rod 30 is then secured into place using nut 66 on the side of the mounting plate 28 closest to the tank 10 and by nut 32 on the side of mounting plate 28 farthest from the tank 10.

Once the mounting plate 28 is coupled to both the vehicle and the mounting rod 30, the tank 10 is coupled to the vehicle.

In order to aid in correctly positioning the spare tire fuel tank 10, spacers 26 (illustrated in FIGS. 1, 13, 17 and 19) may be coupled to the top of the tank body 12. These spacers 26 help to position the tank 10 at the appropriate location within the spare tire well, so that the tank 10 may be correctly mounted.

Spacers 26 may be formed in any shape or configuration desired in order to correctly position the tank 10 within the spare tire location.

Spacers 26 are coupled to spacer mounts 44 formed on the tank body 12 (See FIGS. 2 and 11). Spacer mounts 44 are indentations in the tank body 12 which are designed to receive a coupler which is attached to the spacers 26.

In order to correctly align the spacers 26, markings 46 may be formed in the top of the tank body 12. These markings 46 show the user where the spacers 26 should be placed in order for the tank 10 to be correctly installed in their vehicle.

Accordingly, for the exemplary purposes of this disclosure, the components defining any embodiment of the invention may be formed as one piece if it is possible for the components to still serve their function. The components may also be composed of any of many different types of materials or combinations thereof that can readily be formed into shaped objects provided that the components selected are consistent with the intended mechanical operation of the invention. For example, the components may be formed of rubbers (synthetic and/or natural), glasses, composites such as fiberglass, carbon-fiber and/or other like materials, polymers such as plastic, polycarbonate, PVC plastic, ABS plastic, polystyrene, polypropylene, acrylic, nylon, phenolic, any combination thereof, and/or other like materials, metals, such as zinc, magnesium, titanium, copper, iron, steel, stainless steel, any combination thereof, and/or other like materials, alloys, such as aluminum, and/or other like materials, any other suitable material, and/or any combination thereof.

The embodiments and examples set forth herein were presented in order to best explain the present invention and its practical applications and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the forthcoming claims. Accordingly, any components of the present invention indicated in the drawings or herein are given as an example of possible components and not as a limitation.

The invention claimed is:

1. A combination vehicle and vehicle underside spare tire location fuel tank, comprising:
    a vehicle having a spare tire location on an underside of said vehicle;
    a rigid non-metallic tank body coupled in said spare tire location on said vehicle;
        a plurality of cutouts formed in a surface of said tank body, wherein said plurality of cutouts are varying sizes;
        wherein said plurality of cutouts formed in said tank body allow clearance for at least one cross-beam and at least one pipe in said spare tire location on said vehicle;
        a filler neck in fluid communication with said tank body;
        a fuel line connector coupled to said tank body; and
        wherein said fuel line connector is fluidly coupled to an existing fuel system in said vehicle; and
        a mounting system for coupling said tank body in said spare tire location in said vehicle comprising:
            a mounting neck formed in said tank body, wherein said mounting neck extends from a top of said tank body to a bottom of said tank body;
            a mounting rod located in said mounting neck;
            a base plate coupled to said mounting rod, wherein said base plate further comprises at least one tank retaining hole;
            a mounting plate coupled to said mounting rod; and
            wherein said mounting plate further comprises a winch location coupler system.

2. The combination vehicle and vehicle underside spare tire location fuel tank of claim 1, wherein said plurality of cutouts formed in said tank body are configured to allow said tank body to be placed into different vehicle makes and models.

3. The combination vehicle and vehicle underside spare tire location fuel tank of claim 1, wherein said tank body is formed as a rounded square or rectangle.

4. The combination vehicle and vehicle underside spare tire location fuel tank of claim 1, wherein said mounting system further comprises at least one spacer.

5. The combination vehicle and vehicle underside spare tire location fuel tank of claim 1, wherein said winch location coupler system comprises at least one coupler for attaching said mounting plate to a location normally occupied by a spare tire winch.

6. The combination vehicle and vehicle underside spare tire location fuel tank of claim 1, wherein said winch location coupler system comprises at least one bend in said mounting plate in order to allow said mounting plate to abut a location normally occupied by a spare tire winch.

7. A combination vehicle and vehicle underside spare tire location fuel tank, comprising:
    a vehicle having a spare tire location on an underside of said vehicle;
    a rigid non-metallic tank body coupled in said spare tire location;
    a plurality of cutouts formed in said rigid non-metallic tank body;
    a fill neck in fluid communication with said rigid non-metallic tank body;
    a fuel line connector in fluid communication with said rigid non-metallic tank body;
    wherein said fuel line connector is in fluid communication with an existing fuel system of said vehicle;
    a mounting neck coupled to said rigid non-metallic tank body;
    a mounting rod within said mounting neck;
    a base plate coupled to said mounting rod;
    a mounting plate coupled to said mounting rod; and
    wherein said mounting plate is coupled to a winch location in said spare tire location on said vehicle.

8. The combination vehicle and vehicle underside spare tire location fuel tank of claim 7, wherein said plurality of cutouts allow clearance to at least one cross-beam and at least one pipe in said spare tire location on said vehicle.

9. The combination vehicle and vehicle underside spare tire location fuel tank of claim 8, wherein at least one of cutout of said plurality of cutouts is empty when said tank is coupled in said spare tire location on said vehicle.

10. The combination vehicle and vehicle underside spare tire location fuel tank of claim 7, wherein said plurality of cutouts are configured to allow clearance to at least one cross-beam and at least one pipe in said spare tire location on a variety of vehicle makes and models.

11. The combination vehicle and vehicle underside spare tire location fuel tank of claim 7, further comprising at least one vent in communication with said tank body.

12. The combination vehicle and vehicle underside spare tire location fuel tank of claim 7, further comprising at least one spacer coupled to said tank body.

13. A combination vehicle and vehicle underside spare tire location fuel tank, comprising:
    a vehicle having a spare tire location on an underside of said vehicle;
    a vehicle underside spare tire location fuel tank having a rigid tank body coupled to said vehicle in said spare tire location;
    at least one cutout for an exhaust system of said vehicle on a surface of said tank body, wherein said cutout for said exhaust system provides clearance between said exhaust system and said tank body;
    at least one cutout for a cross-beam of said vehicle on said surface of said tank body, wherein said cutout for said cross-beam provides clearance between said cross-beam and said tank body;
    a filler neck in fluid communication with said tank body;
    a fuel line connector fluidly coupled to said tank body, wherein said fuel line connector is fluidly coupled to a fuel system of said vehicle; and
    a mounting system coupling said tank body to said vehicle, wherein multiple protrusions coupled to said tank body on an outside bottom of said tank body are received in said mounting system to prevent said tank body from rotating.

14. The combination vehicle and vehicle underside spare tire location fuel tank of claim 13, further comprising at least one spacer having an indentation formed in a top of said at least one spacer coupled to said tank body.

15. The combination vehicle and vehicle underside spare tire location fuel tank of claim 13, wherein said tank body is a rounded square or rectangle.

16. The combination vehicle and vehicle underside spare tire location fuel tank of claim 13, further comprising an additional fuel fill opening coupled to said vehicle, wherein said additional fuel fill opening is in fluid communication with said filler neck.

17. The combination vehicle and vehicle underside spare tire location fuel tank of claim 13, further comprising at least one additional cutout for use with at least one vehicle of a second make or model.

18. The combination vehicle and vehicle underside spare tire location fuel tank of claim 13, wherein said mounting system further comprises:
   a mounting neck formed in said tank body, wherein said mounting neck extends from a top of said tank body to a bottom of said tank body;
   a mounting rod located in said mounting neck;
   a base plate coupled to said mounting rod, wherein said base plate further comprises at least one tank retaining hole;
   a mounting plate coupled to said mounting rod; and
   wherein said mounting plate is coupled to a winch location in said spare tire location on said vehicle.

* * * * *